US012750140B2

(12) United States Patent
Dong et al.

(10) Patent No.: US 12,750,140 B2
(45) Date of Patent: Sep. 29, 2026

(54) METHOD AND SYSTEM OF OPTICAL COMMUNICATION WITH HIGH SPECTRAL EFFICIENCY AND LOW POWER CONSUMPTION BASED ON JOINT CHANNEL CODING MODULATION

(71) Applicant: Beijing Institute of Technology, Beijing (CN)

(72) Inventors: Ze Dong, Beijing (CN); Xiangjun Xin, Beijing (CN); Hailian He, Beijing (CN); Junyuan Song, Beijing (CN); Ran Gao, Beijing (CN); Zhipei Li, Beijing (CN); Qi Zhang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 238 days.

(21) Appl. No.: 18/810,641

(22) Filed: Aug. 21, 2024

(65) Prior Publication Data

US 2025/0070883 A1 Feb. 27, 2025

(30) Foreign Application Priority Data

Aug. 24, 2023 (CN) ........................ 202311069995.2

(51) Int. Cl.
*H04B 10/516* (2013.01)
*H04L 1/00* (2006.01)
*H04Q 11/00* (2006.01)

(52) U.S. Cl.
CPC ......... *H04B 10/516* (2013.01); *H04L 1/0041* (2013.01); *H04Q 11/0067* (2013.01)

(58) Field of Classification Search
CPC .................................................. H04B 10/516
See application file for complete search history.

(56) References Cited

U.S. PATENT DOCUMENTS 9,203,558 B1 12/2015 Dave et al.
2014/0270759 A1* 9/2014 Djordjevic ......... H04B 10/2581 398/44

FOREIGN PATENT DOCUMENTS

CN 103259598 A 8/2013
CN 105245277 A 1/2016
CN 110430009 A 11/2019

OTHER PUBLICATIONS

Matsumine et al., "Polar-Coded Modulation for Joint Channel Coding and Probabilistic Shaping", Mitsubishi Electric Research Laboratories, 2019 (Year: 2019).*

(Continued)

*Primary Examiner* — Shi K Li
(74) *Attorney, Agent, or Firm* — Bayramoglu Law Offices LLC

(57) ABSTRACT

An optical communication method and system with high spectral efficiency and low power consumption based on joint channel coding modulation relates to the technical field of high-speed fiber communication. The method includes a data acquisition step, a symbol multiplexing joint channel coding modulation step, a signal optical communication step, a channel equalization step, and a symbol demultiplexing step. The optical communication method and system improves the problems of relative independence of forward error correction channel coding (FEC) and high order modulation function modules, long code length dependence of FEC, limited spectral efficiency promotion under the limitation of fiber nonlinear effect, and high FEC decoding latency and power consumption in optical communication system. It is beneficial to improving the spectral efficiency and capacity of a coherent optical communication system and optimizing the system latency and power consumption.

7 Claims, 6 Drawing Sheets

(56) References Cited

OTHER PUBLICATIONS

Yankov et al., “Rate Adaptive Geometric Constellation Shaping Using Autoencoders and Many-to-One Mapping”, arXiv:2307.09897 [eess.SP], Jul. 2023 (Year: 2023).*

Ze Dong, et al., Demonstration of a highly bandwidth-efficient optical interconnection with symbol division multiplexing pulse amplitude modulation, Optics Letters, 2022, pp. 2454-2457, vol. 47 No. 10.

Yan Xinda, Research on Polar Coding and Multi-layer OFDM Modulation in VLC Systems, A thesis submitted in partial satisfaction of the Requirements for the degree of Master of Engineering, Hunan University, 2016, pp. 1-49.

* cited by examiner

METHOD AND SYSTEM OF OPTICAL COMMUNICATION WITH HIGH SPECTRAL EFFICIENCY AND LOW POWER CONSUMPTION BASED ON JOINT CHANNEL CODING MODULATION

CROSS REFERENCE TO THE RELATED APPLICATIONS

This application is based upon and claims priority to Chinese Patent Application No. 202311069995.2, filed on Aug. 24, 2023, the entire contents of which are incorporated herein by reference.

TECHNICAL FIELD

The present disclosure relates to the technical field of optical communication, particularly to a method and system of optical communication with high spectral efficiency and low power consumption based on joint channel coding modulation.

BACKGROUND

High-order modulation is an inevitable way to improve the spectral efficiency within fiber bandwidth resources and achieve high-capacity optical communication. However, the larger the order of high-order modulation, the smaller the minimum Euclidean distance among constellation points, and the greater the impact of channel impairments such as fiber dispersion, nonlinearity, and polarization mode dispersion on the signal, which shorten the effective communication distance limiting the overall capacity. Forward Error Correction (FEC) Channel Coding, one of the key technologies for achieving high spectral efficiency and large capacity optical communication systems, it can improve the sensitivity of the optical signal-to-noise ratio (SNR) and effectively improve the reliability of signal communication. The Shannon information theory provides the basic relationship between spectral efficiency (channel capacity) and SNR. Still, the functional modules of FEC and high-order modulation are relatively independent, the mathematical correlation degree between them is unclear, and the optical communication capacity model of joint channel coding and high-order modulation is less mentioned. It is important to use joint coding and high-order modulation to improve spectral efficiency and achieve high capacity in optical communication systems with limited fiber bandwidth resources. This involves creating a mathematical association between coded bits and modulation symbols to integrate coded and high-order modulation modules. Theoretically, the longer the channel coding code length is, the greater the gain of the optical communication SNR is, and the greater the receiver delay is, which limits the application scenarios of joint channel coding modulation technology. Therefore, the joint channel coding technology with high spectral efficiency and low latency holds significant research value in high-speed optical communication systems.

With the increasing demand for communication capacity, various new technologies are urgently needed to improve communication capacity and performance, and polarization channel coding is one of them. Polar code is a channel coding mode based on the theory of channel polarization. It has a short code length and can reach the Shannon limit in theory. Also, the Polar code has a simple coding structure, and the code rate is flexible and adjustable, so it has been selected as the coding mode of the 5G-NR control channel.

The design of encoding and decoding is based on Polar short code parallel iteration, combined with joint channel coding modulation technology. This is the key technology to achieve an optical communication system with high spectral efficiency and low latency.

Therefore, it is an urgent problem for those skilled in the art to provide an optical communication method and system that offers high spectral efficiency and low power consumption based on joint channel coding modulation to address the existing issues.

SUMMARY

Given this, the present disclosure provides an optical communication method and an optical communication system with high spectral efficiency and low power consumption based on joint channel coding modulation which can improve the optical communication capacity and the system spectral efficiency, and reduce latency and power consumption of the system.

To achieve the above effects, the present disclosure adopts the following technical solutions.

An optical communication method and an optical communication system with high spectral efficiency and low power consumption based on joint channel coding modulation include the following steps.

A data acquisition step of acquiring signal source data generated by the user information;

- a symbol multiplexing step of performing channel coding and rate matching on signal source data based on a forward error correction of a polar code, sending the signal source data to an interleaver for interleaving, and sending the signal source data to a symbol multiplexer for many-to-one mapping and high order modulation to obtain a high spectral efficiency symbol multiplexing signal modulated by high spectral efficiency and short code joint channel coding;
- a signal communication step of carrying out the digital-to-analog conversion and polarization multiplexing in-phase and quadrature (IQ) modulation on the high spectral efficiency symbol multiplexing signal to realize electro-optical conversion, sending the generated optical signal to the fiber for communication to the optical receiver. The receiver receives signals by adopting a coherent detector, and then carries out analog-to-digital conversion to collect data to obtain the analog-to-digital converted signal;
- a channel equalization step of preliminarily obtaining the constellation information of the communication signal by performing clock recovery, dispersion compensation, polarization demultiplexing, frequency offset compensation, and phase recovery on the analog-to-digital converted signal; and
- a symbol demultiplexing step of obtaining a signal constellation point of constellation information of the communication signal, realizing a bit interleaving polarization demodulation and iterative decoding process through multi-module iterative decoding based on soft information interaction, realizing joint symbol demultiplexing and FEC decoding, and recovering information bit data of the data source.

The above method, optionally, the symbol multiplexing step is based on the joint polar code channel coding modulation theory.

In the above method, optionally, in the symbol multiplexing step, every 5 binary symbols in the polarized channel encoded binary bit stream are modulated and mapped to a high order modulation symbol. Traditional 5-bit symbol modulation requires 32 different constellation symbols, 32 quadrature amplitude modulation (QAM), to carry. The core of symbol multiplexing is the many-to-one overlapping mapping of joint channel coding. According to the principle of minimum Hamming distance between symbols and within symbols, every group of 4 high-order modulation 32 QAM symbols is overlapped and mapped to 1 constellation point. Four 32 QAM symbols are overlapped on each constellation point of joint channel coding modulation to generate a symbol multiplexed 8 QAM signal.

The above method, optionally, in the process of signal communication, after fiber communication, coherent detection, and digital signal processing channel equalization, the symbol demultiplexing process for the symbol multiplexing step can be expressed as:

$$S_{De\text{-}SDM}(t) = y(t)\square\xi^{-1}(\Upsilon, LLR^{ID});$$

wherein, y(t) is the digital signal after signal equalization, $\xi^{-1}(\square)$ is the demultiplexing process of the symbol multiplexing signal, $\gamma$ is the soft decision rule and $LLR^{ID}$ is the prior information represented by logarithmic likelihood ratio.

The above method, optionally, in the symbol demultiplexing step, in the first round of high-order modulation and demodulation, the posterior probability of each demodulated optical communication symbol $$Tx_t^i$$

at the time t is assigned with an equal probability value for initialization, and then the symbol soft information is continuously iterated in the Polar decoder, the posterior probability information of $$Tx_t^i$$

is generated simultaneously. Appoint $$L_e^{DeI}(v_t^i)$$

as the deinterleaved extrinsic information and $$L_e^{In}(v_t^i)$$

as the interleaved extrinsic information, $$L_a^{DeI}(v_t^i)$$

as prior information of the Polar decoder and $$L_a^{In}(v_t^i)$$

as prior information of the symbol multiplexing QAM demapper respectively, update the difference between $$L_e^{In}(v_t^i) \text{ and } L_a^{In}(v_t^i)$$

through interleaving, and then sent back to that symbol multiplexing QAM demapper for the next round of parallel outer iteration.

In the above method, optionally, in the symbol demultiplexing step, the external information $$L_e^{DeI}(v_t^i)$$

obtained from the symbol multiplexing QAM demapper is de-interleaved and passed to the root node of the Polar decoder as external information, the soft information continuously iterates and updates between the polar root node and the polar leaf node, and after each cycle, the log-likelihood ratios (LLRs) output from the Polar decoder are used to update $$L_e^{In}(v_t^i)$$

for the next outer iteration.

An optical communication system with high spectral efficiency and low power consumption based on joint channel coding modulation, which can be applied to any one of the optical communication methods with high spectral efficiency and low power consumption based on joint channel coding modulation, including a data acquisition module, a symbol multiplexing module, a signal communication module, a channel equalization module, and a symbol demultiplexing module;

the data acquisition module is configured to acquire signal source data generated by the user information;

the symbol multiplexing module is configured to perform channel coding and rate matching on signal source data based on a forward error correction of a polar code, send the signal source data to an interleaver for interleaving, and send the signal source data to a symbol multiplexer for many-to-one mapping and high order modulation to obtain a high spectral efficiency symbol multiplexing signal modulated by high spectral efficiency and short code low latency joint channel coding;

the signal communication module is configured to carry out digital-to-analog conversion and polarization multiplexing IQ modulation on the high spectral efficiency symbol multiplexing signal to realize electro-optical conversion, and send the generated optical signal to the fiber for communication to the optical receiver. The receiver receives signals by adopting a coherent detector, and then carries out analog-to-digital conversion to collect data to obtain the analog-to-digital converted signal;

the channel equalization module is configured to obtain the constellation information of the communication signal by performing clock recovery preliminarily, dispersion compensation, polarization demultiplexing, frequency offset compensation, and phase recovery on the analog-to-digital converted signal; and the symbol demultiplexing module is configured to obtain a signal constellation point of constellation information of the communication signal, realize a bit interleaving polarization demodulation and iterative decoding process through multi-module iterative decoding based on soft information interaction, realize joint symbol demultiplexing and FEC decoding, and recover information bit data of the data source.

According to the above technical solutions, compared with the prior art, the present disclosure provides an optical communication method and an optical communication system with high spectral efficiency and low power consumption based on joint channel coding modulation which has the following beneficial effects:

(1) The symbol multiplexing technology is used to enhance the capacity of high-order modulation symbols by employing many-to-one overlapping mapping, thus improving the spectral efficiency.

(2) At the same time, the Euclidean distance between constellation points is enlarged by reducing the number of high-order modulation constellation points, and the tolerance to fiber dispersion and nonlinear effects is improved. and (3) The parallel iterative design of the short-code polarization code is provided. This breakthrough eliminates the dependence of the gain of the optical communication high SNR on long code and long channel coding, resulting in a system with low delay characteristics.

BRIEF DESCRIPTION OF THE DRAWINGS

To clearly illustrate the embodiments of the present disclosure or technical solutions in the related art, the accompanying drawings used in the embodiments or the related art will now be described briefly. It is obvious that the drawings in the following description are only the embodiment of the disclosure, and that those skilled in the art can obtain other drawings from these drawings without any creative efforts.

DETAILED DESCRIPTION OF THE EMBODIMENTS

In the following, the technical solutions in the embodiments of the present disclosure will be clearly and completely described regarding the drawings in the embodiments of the present disclosure. The described embodiments are only a part of the embodiments of the present disclosure, but not all the embodiments thereof. Based on the embodiments of the present disclosure, all other embodiments obtained by those skilled in the art without any creative efforts shall fall within the scope of the present disclosure.

In the application, relational terms such as first and second are only used to distinguish one entity or operation from another entity or operation without necessarily requiring or implying any such actual relationship or order between such entities or operations. The terms "include," "comprise," or any other variation thereof are intended to encompass non-exclusive inclusion, such that processes, methods, articles, or equipment that include a series of elements not only include those elements, but also include other elements not explicitly listed, or elements inherent to such processes, methods, articles, or equipment. Without further restriction, the element defined by the statement 'including one . . . ' does not exclude the existence of other identical elements in the processes, methods, articles, or equipment.

Figure 1:
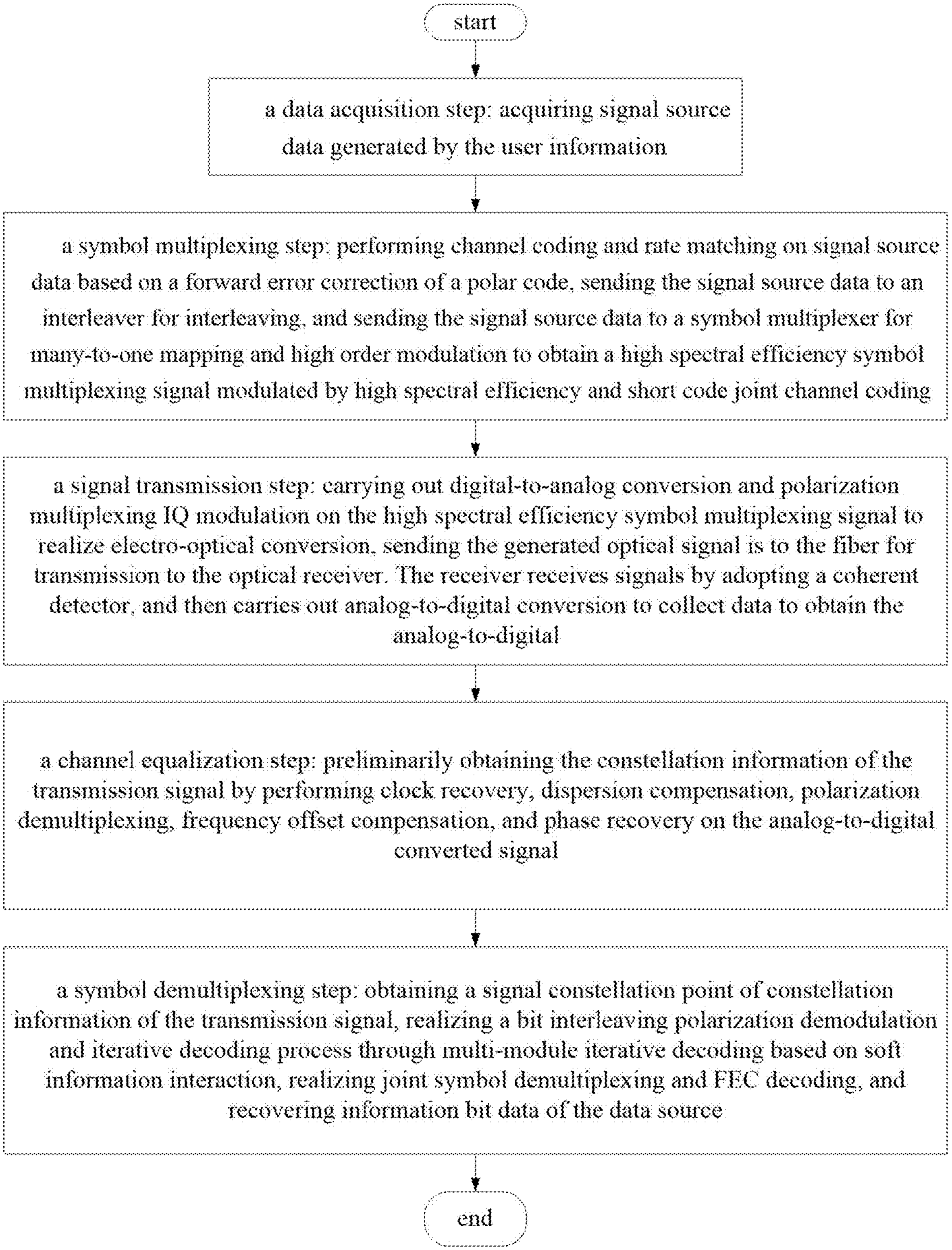
FIG. 1 is a flow chart of an optical communication method with high spectral efficiency and low power consumption based on joint channel coding modulation provided by the present disclosure.

Referring to FIG. 1, the present disclosure discloses an optical communication method and an optical communication system with high spectral efficiency and low power consumption based on joint channel coding modulation, including the following steps:

a data acquisition step of acquiring signal source data generated by the user information;

a symbol multiplexing step of performing channel coding and rate matching on signal source data based on a forward error correction of a polar code, sending the signal source data to an interleaver for interleaving, and sending the signal source data to a symbol multiplexer for many-to-one mapping and high order modulation to obtain a high spectral efficiency symbol multiplexing signal modulated by high spectral efficiency and short code joint channel coding;

a signal communication step of carrying out the digital-to-analog conversion and polarization multiplexing IQ modulation on the high spectral efficiency symbol multiplexing signal to realize electro-optical conversion, sending the generated optical signal to the fiber for communication to the optical receiver. The receiver receives signals by adopting a coherent detector, and then carries out analog-to-digital conversion to collect data to obtain the analog-to-digital converted signal;

a channel equalization step of preliminarily obtaining the constellation information of the communication signal by performing clock recovery, dispersion compensation, polarization demultiplexing, frequency offset compensation, and phase recovery on the analog-to-digital converted signal; and a symbol demultiplexing step of obtaining a signal constellation point of constellation information of the communication signal, realizing a bit interleaving polarization demodulation and iterative decoding process through multi-module iterative decoding based on soft information interaction, realizing joint symbol demultiplexing and FEC decoding, and recovering information bit data of the data source.

Furthermore, the symbol multiplexing step is based on the joint polar code channel coding modulation theory.

Figure 2:
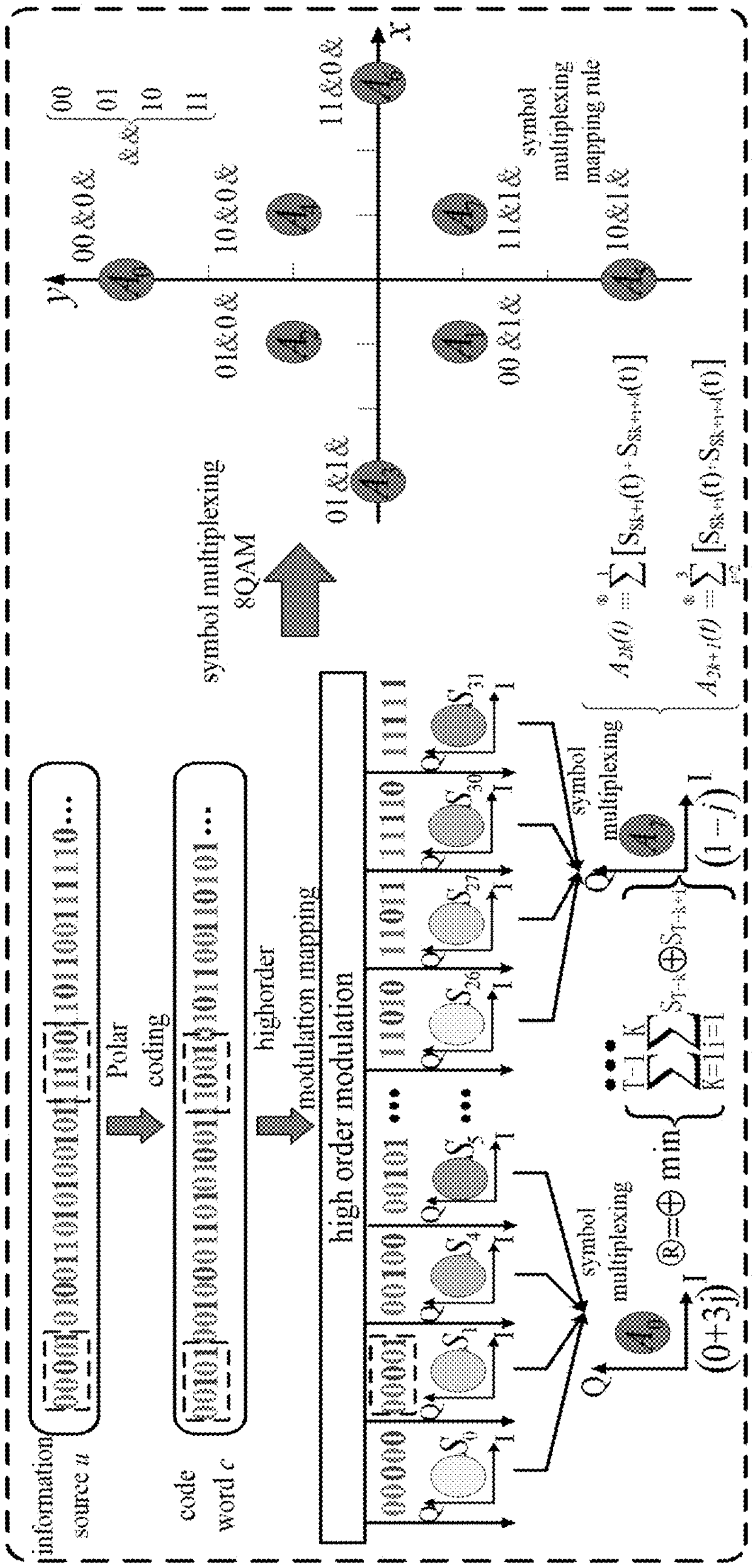
FIG. 2 is a schematic diagram of symbol multiplexing joint channel coding modulation provided by the present disclosure.

Furthermore, as shown in FIG. 2, in the symbol multiplexing step, every 5 binary symbols in the polarized channel encoded binary bit stream is modulated and mapped to a high-order modulation symbol. Traditional 5-bit symbol modulation requires 32 different constellation symbols, 32 QAM, to carry. The core of symbol multiplexing is the many-to-one overlapping mapping of joint channel coding. According to the principle of minimum Hamming distance between symbols and within symbols, every group of 4 high order modulation symbols is overlapped and mapped to 1 constellation point. Four 32 QAM symbols are overlapped on each constellation point of joint channel coding modulation to generate a symbol multiplexed 8 QAM signal.

Specifically, the mapping rule is:

$$\begin{cases} A_{2k}(t) \overset{\circledR}{=} \sum_{i=0}^{1}[s_{8k+i}(t)+s_{8k+i+4}(t)] \\ \qquad\qquad\qquad\qquad\qquad\qquad k=0,1,2,3; \\ A_{2k+1}(t) \overset{\circledR}{=} \sum_{i=2}^{3}[s_{8k+i}(t)+s_{8k+i+4}(t)] \end{cases}$$

Wherein, A(t) is the constellation point symbol after symbol multiplexing, and s(t) is the binary symbol.

Furthermore, in the process of signal communication, after channel equalization of fiber communication, coherent detection, and digital signal processing, the symbol demultiplexing process for the symbol multiplexing step can be expressed as:

$$S_{De\text{-}SDM}(t) = y(t)\square\xi^{-1}(\Upsilon, LLR^{ID});$$

wherein, y(t) is the digital signal after signal equalization, $\xi^{-1}(\square\ )$ is the demultiplexing process of symbol multiplexing signal, $\gamma$ is the soft decision rule, and $LLR^{ID}$ is the prior information represented by logarithmic likelihood ratio.

Figure 3:
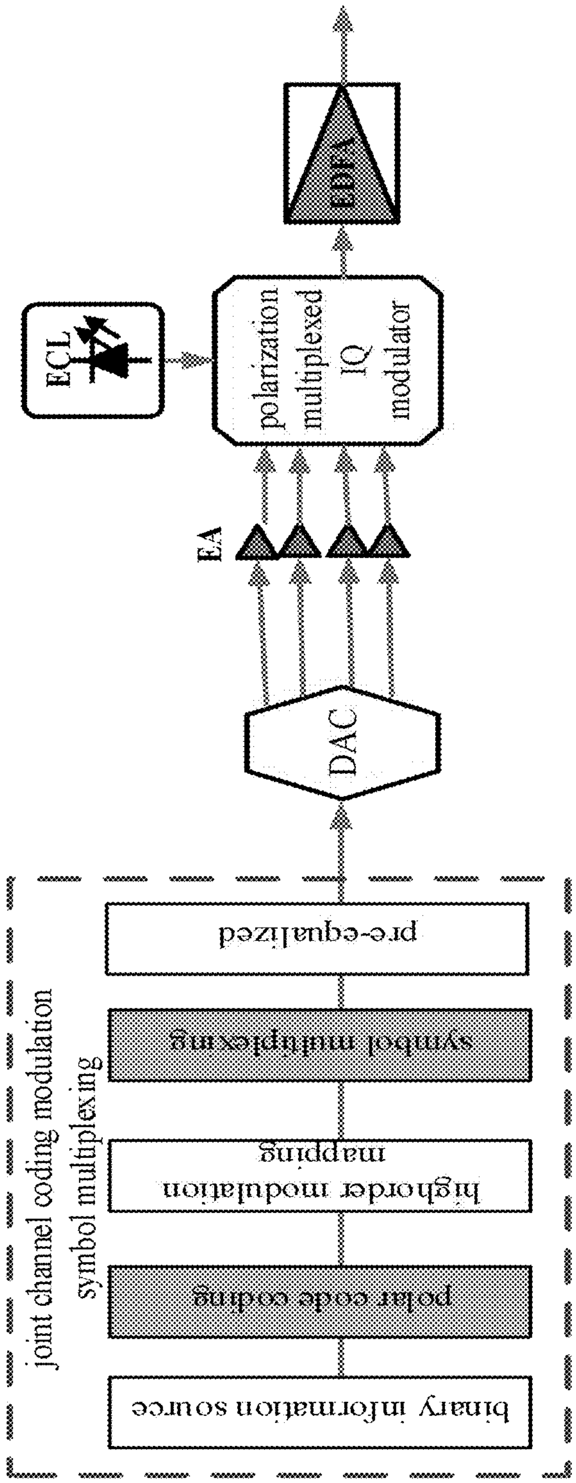
FIG. 3 is a flow chart of symbol demultiplexing provided by the present disclosure.

Specifically, as shown in FIG. 3, the transmitting end includes a laser, a data generation arbitrary waveform generator AWG, an electric drive amplifier, an optical IQ modulator, a polarization multiplexer, and a waveform selector WSS; and the fiber communication unit includes a commercial standard single-mode fiber and an erbium-doped fiber amplifier. Specifically, at a transmitting end, a symbol multiplexing signal based on short code joint coding modulation is first generated, the specific process is that after an input binary information source sequence is subjected to forward error correction coding with a code rate of ¾ and bit interleaving, a code word sequence is subjected to serial-to-parallel conversion and block mapping. Each symbol of the single carrier over 800 Gb/s 32 QAM signal carries 6 bits of information to carry out many-to-one mapping symbol multiplexing, and every four 32 QAM symbols are mapped to the same constellation point to obtain a symbol multiplexing 8 QAM signal. The electrical signal is pre-equalized and then a DAC is used to generate a symbol multiplexing 16 QAM electrical signal, which is modulated onto an optical carrier generated by a laser by an IQ modulator. Next, polarization multiplexing is used to double the total rate of the channel, and the signal is sent to the single-mode fiber link and transmitted to the receiving end. At the same time, the waveform selector can be used to realize high-density and large capacity optical communication after wavelength division multiplexing.

Figure 4:
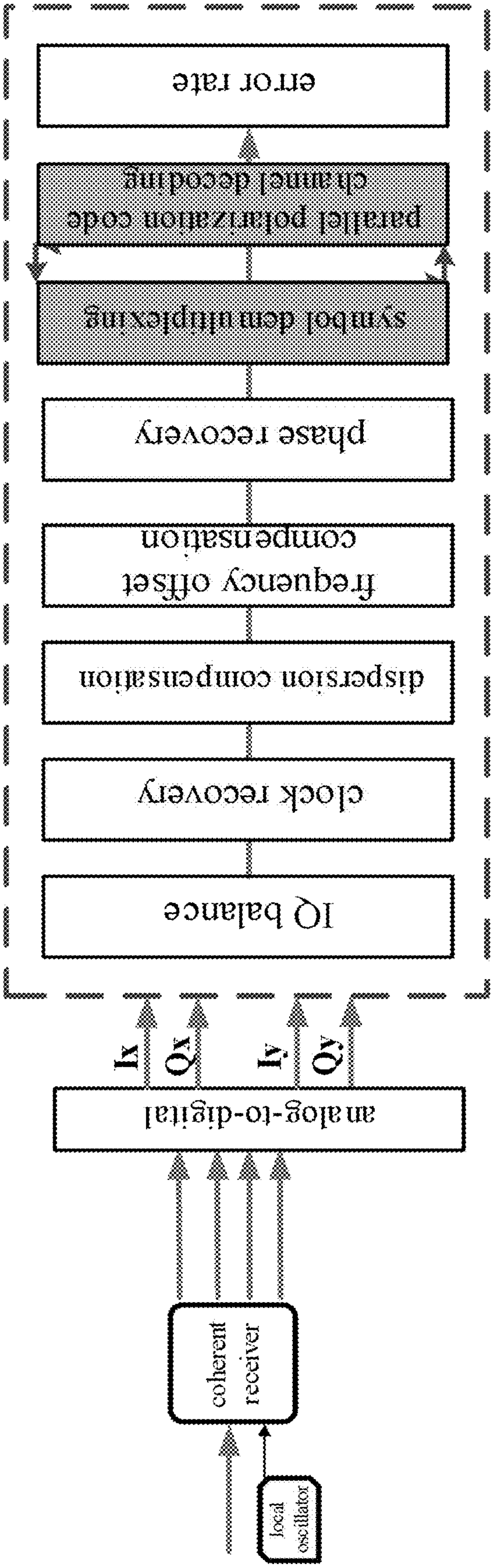
FIG. 4 is a flow chart of the transmitting end of the high-speed optical communication system provided by the present disclosure.

Specifically, as shown in FIG. 4, the receiver includes a tunable optical filter, a local oscillator LO, an integrated coherent receiver including a 90° optical mixer and a balanced receiver, and a high-speed real-time oscilloscope analog-to-digital converter (DAC) for data acquisition. At the receiving end, the integrated coherent receiver including a 90° optical mixer and a balanced receiver performs optical mixing and balanced photoelectric conversion on a local oscillation LO signal and a received optical symbol multiplexing signal. Then a high-speed real-time oscilloscope with a sampling rate of 256 GSa/s is used for carrying out analog-to-digital conversion and data acquisition on two polarization states of a signal and four channels of IQ electrical signals, and finally the acquired digital signals are sent to an off-line digital signal processing DSP unit, the processing process mainly includes: IQ balance, clock recovery, dispersion compensation, frequency offset compensation, phase recovery, symbol demultiplexing, parallel polarization code channel decoding and error rate calculation; wherein the clock recovery includes clock synchronization and 2 times resampling, the frequency offset compensation adopts the polarization demultiplexing method, and the phase recovery adopts the channel equalization method, and parallel polarization code channel decoding is based on forward error correction decoding.

Figure 5:
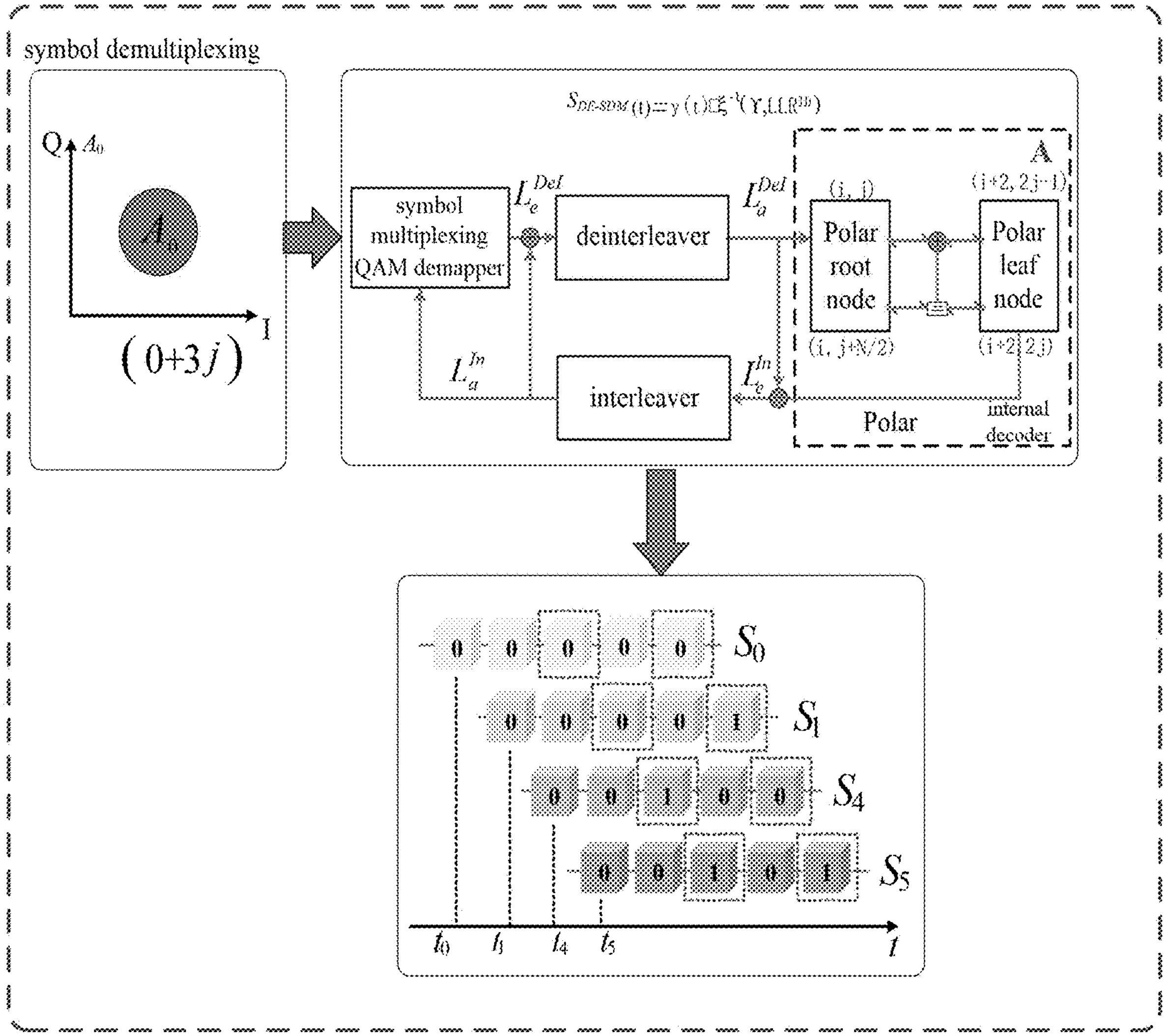
FIG. 5 is a flow chart of the receiving end of the high-speed optical communication system provided by the present disclosure.

Furthermore, as shown in FIG. 5, in the symbol demultiplexing step, in the first round of high-order modulation and demodulation, the posterior probability of each demodulated optical communication symbol $$Tx_t^i$$

at the time t is assigned with an equal probability value for initialization, and then the symbol soft information is continuously iterated in the Polar decoder for Polar decoding, the posterior probability information of $$Tx_t^i$$

is generated at the same time. Appoint $$L_e^{Del}(v_t^i)$$

as the deinterleaved extrinsic information and $$L_e^{In}(v_t^i)$$

as the interleaved extrinsic information, aldelv and alinv $$L_a^{Del}(v_t^i)$$

as prior information of the Polar decoder and $$L_a^{In}(v_t^i)$$

as prior information of the symbol multiplexing QAM demapper respectively, update the difference between $$L_e^{In}(v_t^i) \text{ and } L_0^{In}(v_t^i)$$

through interleaving, and then sent back to that symbol multiplexing QAM demapper for the next round of parallel outer iteration.

Furthermore, the external information $$L_e^{Del}(v_t^i)$$

obtained from the symbol multiplexing QAM demapper is de-interleaved and passed to the root node of the Polar decoder as external information, the soft information continuously iterates and updates between the polar root node and the polar leaf node, and after each cycle, the LLRs output from the Polar decoder are used to update $$L_e^{In}(v_t^i)$$

for the next outer iteration

As shown in FIG. 5, module A is a Polar decoder, consisting of a root node decoder (RND) and a leaf node decoder (LND). The information exchange between RND and LND is called an inner loop, while the information exchange between module A and the symbol multiplexing QAM demapper is called an outer loop. The joint iterative decoding system adopts the maximum a posteriori probability (MAP) algorithm, which continuously passes the logarithmic likelihood ratio soft information between module A and the symbol multiplexing QAM demapper to achieve joint demultiplexing and iterative decoding.

For each symbol $$S_{De-SDM}(t) \Leftrightarrow \left(v_t^{5i}, v_t^{5i+1}, \ldots v_t^{5i+4}\right)$$

to be demultiplexing, the LLRs output by the symbol multiplexing QAM demapper can be represented as:

$$LLR(v_t^i) = \log\frac{p(v_t^i = 0 \mid y(t))}{p(v_t^i = 1 \mid y(t))} = \log\frac{\sum_{Tx_t^i \in \chi(i,0)} p(Tx_t^i \mid y(t))}{\sum_{Tx_t^i \in \chi(i,1)} p(Tx_t^i \mid y(t))} = \log\frac{\sum_{Tx_t^i \in \chi(i,0)} p(y(t) \mid Tx_t^i)p(Tx_t^i)}{\sum_{Tx_t^i \in \chi(i,1)} p(y(t) \mid Tx_t^i)p(Tx_t^i)}$$

Wherein, $$Tx_t^i$$

includes the subsets $$\chi(i, 0) = \{s \mid v_t^i = 0\} \text{ and } \chi(i, 1) = \{s \mid v_t^i = 1\}.$$

For SDM-8 QAM, the subset size of each symbol is 5. In the first round of demodulation, $$p(Tx_t^i)$$

is posterior probability of each demodulated communication symbol $$Tx_t^i$$

at the time t is assigned with an equal probability value for initialization. Then, the soft information is continuously iterated in the module A to perform Polar decoding and generate the posterior probability information of $$Tx_t^i.$$

Appoint $$L_e^{Del}(v_t^i)$$

as the deinterleaved extrinsic information and $$L_e^{In}(v_t^i)$$

as the interleaved extrinsic information, similarly, appoint $$L_a^{Del}(v_t^i)$$

as prior information of the Polar decoder and $$L_a^{In}(v_t^i)$$

as prior information of the symbol multiplexing QAM demapper respectively.

$$L_e^{In}(v_t^i)$$

is interleaved and sent back to the symbol multiplexing QAM demapper as $$L_e^{In}(v_t^i)$$

for the next round of outer iteration. The prior information of $$Tx_t^i$$

can be expressed as:

$$p(Tx_t^i) = \prod_{i=0}^{4} p(v_t^i);$$

-continued $$p(v_t^i=0)=1-p(v_t^i=1)=\frac{1}{1+e^{L_a^{In}(v_t^i)}}\quad i=0,1,2,\ldots 4;$$

wherein, $$p(v_t^i)$$

is the prior probability of each transmitted coded bit $$v_t^i.$$

The extrinsic information $$L_e^{Del}(v_t^i)$$

obtained from the symbol multiplexing QAM demapper is passed to the Polar RND of module A as extrinsic information after deinterleaving.

$$L_e^{Del}(v_t^i)=LLR(v_t^i)-L_a^{Del}(v_t^i)(i=0,1,\ldots 4)$$

Then, the soft information is updated iteratively in Polar RND and Polar LND. This process is called an inner loop. The inner loop assists the outer loop to reduce the number of operations and improve efficiency.

$$\begin{cases} L_{l,f}=\mu\left(L_{l+1,2f-1},\,R_{l,f+N/2}+L_{l+1,2f}\right)\\ L_{l,f+N/2}=\mu(R_{l,f},\;L_{l+1,2f-1})+L_{l+1,2f}\\ R_{l+1,2f-1}=\mu\left(R_{l,f},\,L_{l+1,2f}+R_{l,f+N/2}\right)\\ R_{l+1,2f}=\mu(R_{l,f},\,L_{l+1,2f-1})+R_{l,f+N/2}\end{cases}$$

$$\left(l=1,\;2,\ldots\;\log_2 N,\;f=1,2,\ldots\;N/2\right)$$

the LLR transfer from LND to RND is defined as $L_{l,f}$ and the LLR transfer from RND to LND is defined as $R_{l,f}$. The function μ(·) is defined as $$\mu(x,\,y)=\ln(1+xy)-\ln(x+y)$$

After each inner loop, LLRs are output from the Polar decoder to update $$L_e^{In}(v_t^i)$$

for the next outer iteration. The decoding output is based on the sum of the soft information of $R_{1,f}$ and $L_{1,f}$, that is, the sum of the posterior probabilities, to make a decision.

Figure 6:
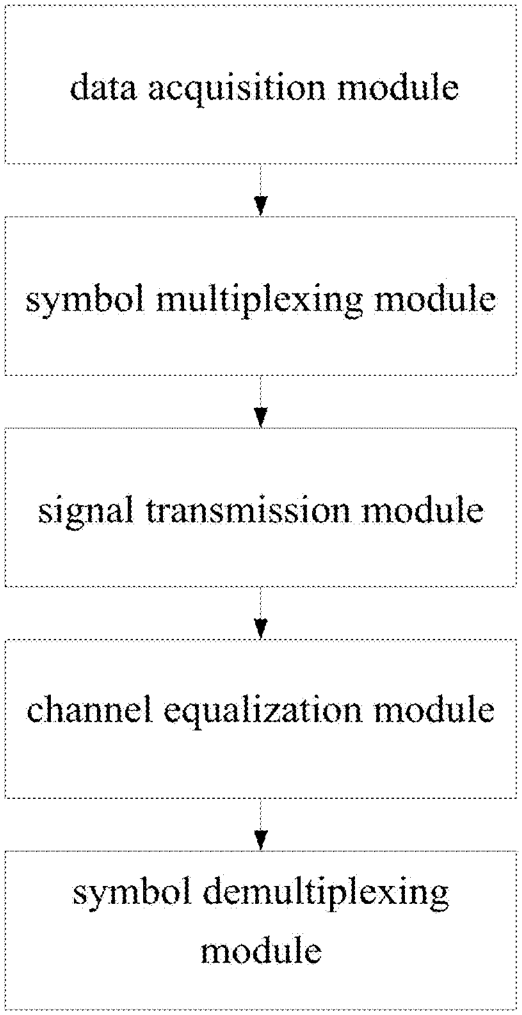
FIG. 6 is a structural diagram of the optical communication system with high spectral efficiency and low power consumption based on joint channel coding modulation provided by the present disclosure.

Corresponding to the method described in FIG. 1, the embodiments of the present disclosure also provide an optical communication system with high spectral efficiency and low power consumption based on joint channel coding modulation for the specific implementation of the method in FIG. 1. Referring to FIG. 6, the system includes a data acquisition module, a symbol multiplexing module, a signal communication module, a channel equalization module, and a symbol demultiplexing module;

the data acquisition module is configured to acquire signal source data generated by the user information;

the symbol multiplexing module is configured to perform channel coding and rate matching on signal source data based on a forward error correction of a polar code, send the signal source data to an interleaver for interleaving, and send the signal source data to a symbol multiplexer for many-to-one mapping and high order modulation to obtain a high spectral efficiency symbol multiplexing signal modulated by high spectral efficiency and short code joint channel coding;

the signal communication module is configured to carry out digital-to-analog conversion and polarization multiplexing IQ modulation on the high spectral efficiency symbol multiplexing signal to realize electro-optical conversion, and send the generated optical signal to the fiber for communication to the optical receiver. The receiver receives signals by adopting a coherent detector, and then carries out analog-to-digital conversion to collect data to obtain the analog-to-digital converted signal;

the channel equalization module is configured to obtain the constellation information of the communication signal by performing clock recovery preliminarily, dispersion compensation, polarization demultiplexing, frequency offset compensation, and phase recovery on the analog-to-digital converted signal; and the symbol demultiplexing module is configured to obtain a signal constellation point of constellation information of the communication signal, realize a bit interleaving polarization demodulation and iterative decoding process through multi-module iterative decoding based on soft information interaction, realize joint symbol demultiplexing and FEC decoding, and recover information bit data of the data source.

The above description of the disclosed embodiments enables those skilled in the art to implement or use the present disclosure. Various amendments to the embodiments will be apparent to those skilled in the art. The general principles defined herein may be implemented in other embodiments without departing from the spirit or scope of the disclosure. Therefore, the present disclosure will not be limited to the embodiments shown herein but is to be accorded the widest scope consistent with the principles and novel features disclosed herein.

What is claimed is:

1. An optical communication method with high spectral efficiency and low power consumption based on joint channel coding modulation, comprising:

a data acquisition step: acquiring signal source data generated by user information;

a symbol multiplexing step: performing channel coding and rate matching on the signal source data based on a forward error correction of a polar code Polar, sending the signal source data to an interleaver for interleaving, and sending the signal source data to a symbol multiplexer for many-to-one mapping and high order modulation to obtain a high spectral efficiency symbol multiplexing signal modulated by high spectral efficiency and short code joint channel coding;

a signal communication step: carrying out digital-to-analog conversion and polarization multiplexing in-phase and quadrature (IQ) modulation on the high spectral efficiency symbol multiplexing signal to realize electro-optical conversion to generate an optical signal, sending the optical signal to a fiber for communication to an optical receiver; the optical receiver receives the optical signal by adopting a coherent detector, and then carries out analog-to-digital conversion to collect data to obtain an analog-to-digital converted signal;

a channel equalization step: obtaining constellation information of a communication signal preliminarily by performing clock recovery, dispersion compensation, polarization demultiplexing, frequency offset compensation, and phase recovery on the analog-to-digital converted signal; and a symbol demultiplexing step: obtaining constellation point information of the communication signal, realizing a bit interleaving polarization demodulation and iterative decoding process through multi-module iterative decoding based on soft information interaction, realizing joint symbol demultiplexing and forward error correction (FEC) decoding, and recovering information bit data of a data source.

2. The optical communication method with high spectral efficiency and low power consumption based on joint channel coding modulation according to claim 1, wherein the symbol multiplexing step is based on a joint polar code channel coding modulation theory.

3. The optical communication method with high spectral efficiency and low power consumption based on joint channel coding modulation according to claim 1, wherein in the symbol multiplexing step, every 5 binary symbols in a polarized channel encoded binary bit stream are modulated and mapped to a high order modulation symbol; traditional 5-bit symbol modulation requires a total of 32 different constellation symbols, 32 quadrature amplitude modulation (QAM), to carry; a core of symbol multiplexing is many to one overlapping mapping of joint channel coding; according to a principle of minimum Hamming distance between symbols and within symbols, every group of 4 high order modulation 32 QAM symbols is overlapped and mapped to 1 constellation point; four 32QAM symbols are overlapped on each constellation point of joint channel coding modulation to generate a symbol multiplexed 8 QAM signal.

4. The optical communication method with high spectral efficiency and low power consumption based on joint channel coding modulation according to claim 1, wherein in a process of signal communication, after fiber communication, coherent detection, and digital signal processing channel equalization, a symbol demultiplexing process for the symbol multiplexing step is expressed as:

$$S_{De\text{-}SDM}(t) = y(t)\square\xi^{-1}(\Upsilon, LLR^{ID});$$

wherein, y(t) is a digital signal after signal equalization, $\xi^{-1}(\square\ )$ is a demultiplexing process of the high spectral efficiency symbol multiplexing signal, $\gamma$ is a soft decision rule, and $LLR^{ID}$ is prior information represented by logarithmic likelihood ratio.

5. The optical communication method with high spectral efficiency and low power consumption based on joint channel coding modulation according to claim 1, wherein in the symbol demultiplexing step, in a first round of high order modulation and demodulation, a posterior probability of each demodulated optical communication symbol $$Tx_t^i$$

at a time t is assigned with an equal probability value for initialization, and then symbol soft information is continuously iterated in a Polar decoder for Polar decoding, and meanwhile, posterior probability information of $$Tx_t^i$$

is generated; appointing $$L_e^{DeI}(v_t^i)$$

as deinterleaved extrinsic information and $$L_e^{In}(v_t^i)$$

as interleaved extrinsic information, $$L_a^{DeI}(v_t^i)$$

as prior information of the Polar decoder and $$L_a^{In}(v_t^i)$$

as prior information of a symbol multiplexing QAM demapper respectively, a difference between $$L_e^{In}(v_t^i) \text{ and } L_a^{In}(v_t^i)$$

is updated through interleaving, and then sent back to the symbol multiplexing QAM demapper for a next round of parallel outer iteration.

6. The optical communication method with high spectral efficiency and low power consumption based on joint channel coding modulation according to claim 5, wherein in the symbol demultiplexing step, external information $$L_e^{DeI}(v_t^i)$$

obtained from the symbol multiplexing QAM demapper is de-interleaved and passed to a root node of the Polar decoder as the external information, soft information continuously iterates and updates between a polar root node and a polar leaf node, and after each cycle, the log-likelihood ratios (LLRs) output from the Polar decoder are used to update $$L_e^{In}(v_t^i)$$

for the next outer iteration.

7. An optical communication system with high spectral efficiency and low power consumption based on joint channel coding modulation, wherein the optical communication system is applied to an optical communication method with high spectral efficiency and low power consumption based on joint channel coding modulation, and the optical communication system comprises: a data acquisition module, a symbol multiplexing module, a signal communication module, a channel equalization module, and a symbol demultiplexing module; wherein the data acquisition module, configured to acquire signal source data generated by user information;

the symbol multiplexing module, configured to perform channel coding and rate matching on the signal source data based on a forward error correction of a polar code, send the signal source data to an interleaver for interleaving, and send the signal source data to a symbol multiplexer for many-to-one mapping and high order modulation to obtain a high spectral efficiency symbol multiplexing signal modulated by high spectral efficiency and short code joint channel coding;

the signal communication module, configured to carry out digital-to-analog conversion and polarization multiplexing IQ modulation on the high spectral efficiency symbol multiplexing signal to realize electro-optical conversion to generate an optical signal, send the optical signal to the fiber for communication to an optical receiver; the optical receiver receives the optical signal by adopting a coherent detector, and then carries out analog-to-digital conversion to collect data to obtain an analog-to-digital converted signal;

the channel equalization module, configured to obtain constellation information of a communication signal by performing clock recovery preliminarily, dispersion compensation, polarization demultiplexing, frequency offset compensation, and phase recovery on the analog-to-digital converted signal; and the symbol demultiplexing module, configured to obtain a signal constellation point of constellation information of the communication signal, realize a bit interleaving polarization demodulation and iterative decoding process through multi-module iterative decoding based on soft information interaction, realize joint symbol demultiplexing and FEC decoding, and recover information bit data of a data source.

* * * * *